(12) United States Patent
Lugt et al.

(10) Patent No.: US 11,781,595 B2
(45) Date of Patent: Oct. 10, 2023

(54) DEEP GROOVE BALL BEARING

(71) Applicant: Aktiebolaget SKF, Gothenburg (SE)

(72) Inventors: Pieter Martin Lugt, TA Vianen (NL); Mourad Chennaoui, RE Amsterdam (NL); Nicola de Laurentis, AC Houten (NL); Sathwik Chatra Kalsanka Ramakrishna, Nieuwegein (NL); Jun Wang, Delfgauw (NL); Frank Berens, Saunay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/751,830

(22) Filed: May 24, 2022

(65) Prior Publication Data
US 2022/0389963 A1 Dec. 8, 2022

(30) Foreign Application Priority Data

Jun. 7, 2021 (CN) .......................... 202110631226.1

(51) Int. Cl.
| | | |
|---|---|---|
| *F16C 19/16* | (2006.01) | |
| *F16C 33/41* | (2006.01) | |
| *F16C 33/66* | (2006.01) | |
| *F16C 33/38* | (2006.01) | |
| *F16C 19/06* | (2006.01) | |
| *F16C 33/78* | (2006.01) | |

(52) U.S. Cl.
CPC .......... *F16C 33/3875* (2013.01); *F16C 19/06* (2013.01); *F16C 19/166* (2013.01); *F16C 33/416* (2013.01); *F16C 33/6603* (2013.01); *F16C 33/78* (2013.01)

(58) Field of Classification Search
CPC ........ F16C 19/06; F16C 19/16; F16C 19/166; F16C 33/3875; F16C 33/41; F16C 33/412; F16C 33/416; F16C 33/6603; F16C 33/6688; F16C 33/78
See application file for complete search history.

(56) References Cited

U.S. PATENT DOCUMENTS

| | | | | |
|---|---|---|---|---|
| 2004/0032998 A1* | 2/2004 | Iwata | ..................... | F16C 33/585 384/513 |
| 2011/0010930 A1* | 1/2011 | Choi | ..................... | F16C 43/045 29/724 |
| 2021/0108680 A1 | 4/2021 | Niedermeier | | |

FOREIGN PATENT DOCUMENTS

| | | | | |
|---|---|---|---|---|
| DE | 19981506 B4 * | 5/2006 | ............... | C21D 9/40 |
| DE | 10393924 B4 * | 8/2007 | ............ | F16C 19/166 |
| EP | 2762554 A1 * | 8/2014 | .......... | C10M 169/02 |

(Continued)

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

A deep groove ball bearing providing an inner ring, an outer ring and a plurality of balls being arranged between the inner ring and the outer ring. The inner ring and the outer ring each include a raceway for the plurality of balls. Each raceway encompasses the plurality of balls symmetrically. The deep groove ball bearing is lubricated by a lubricant being arranged on each axial side of the plurality of balls. The raceways are offset in the same axial direction from the axial center of the inner ring and the outer ring such that the raceways are offset to the axial side of the deep groove ball bearing where the shear rate acting on the lubricant is higher than on the other axial side of the deep groove ball bearing.

9 Claims, 3 Drawing Sheets

(56) References Cited

FOREIGN PATENT DOCUMENTS

| | | | | |
|---|---|---|---|---|
| JP | H11218144 A | * | 8/1998 | |
| JP | 2003065340 A | * | 3/2003 | ............ F16C 19/166 |
| JP | 2004036825 A | * | 2/2004 | ............ F16C 19/166 |
| JP | 2004036825 A | | 2/2004 | |
| JP | 2007155028 A | * | 6/2007 | .......... F16C 33/3812 |
| JP | 2009156422 A | | 7/2009 | |
| JP | 2017187090 A | * | 10/2017 | .............. F16C 19/06 |
| WO | 2019196988 A1 | | 10/2019 | |

* cited by examiner

DEEP GROOVE BALL BEARING

CROSS-REFERENCE TO RELATED APPLICATIONS

This application claims priority to Chinese Patent Application no. 202110631226.1, filed Jun. 7, 2021, the contents of which is fully incorporated herein by reference.

TECHNICAL FIELD OF THE INVENTION

The present invention relates to a deep groove ball bearing.

BACKGROUND OF THE INVENTION

Ball bearings, for example deep groove ball bearings, typically comprise an inner ring, an outer ring and balls arranged therebetween, wherein the balls are usually accommodated in a cage. Grooves are machined into the rings, wherein the grooves form raceways and are axially symmetrically arranged. Thus, the raceways are disposed symmetrically around the axial center of the inner ring and the outer ring. For a simplified mounting of the balls into the cage often asymmetrical cages, like a snap-type cage with a backbone side and a pronged side, are used. Even if such a cage may simplify the mounting, it has the disadvantage that lubricant, which may be present in the rolling bearing, may be nonuniformly distributed and supplied to the rolling elements due to the different dynamics triggered by the asymmetrical cage. Such an unsymmetrical distribution of lubricant may lead to a nonuniform lubrication of the bearing, in particular of the rolling elements and raceways.

This is due to the fact that the lubricant, for example grease, may be exposed to different shear strain rates. Lubricant, in particular grease, is a shear thinning fluid. This means that the viscosity ($\eta$) of grease is a function of the shear rate ($\dot{\gamma}$) The shear rate ($\dot{\gamma}$) is the rate per second ($s^{-1}$) at which a shearing deformation is applied to the lubricant.

$$\eta = \eta(\dot{\gamma}) \tag{1}$$

This also applies to lubricating oils but is much stronger for grease.

When the grease is stationary ($\dot{\gamma}=0$), then it is like a solid (like butter). But when shearing starts, it becomes kind of fluid. At very high shear rates, the viscosity of the grease approaches that of the base oil (grease=thickener+base oil). The shear rate is defined as $$\dot{\gamma} = \frac{\Delta u}{h} \tag{2}$$

This means that, when grease is arranged between two rotating flat plates, then the shear rate is equal to the difference of the speed ($\Delta u$) and the gap (h) between the plates. In the case of a deep groove ball bearing, the grease is arranged between the balls and sealing elements being arranged at the axial sides of the bearing. The two rotating plates are in this case represented by the balls and the sealing elements or, when a cage is provided, by the cage and the sealing elements.

Typically, the bearing is initially filled with grease. It is not completely packed with grease. Usually around 30% of the free volume of the bearing is filled with grease. When the bearing starts rotating, then the balls will very quickly push grease to both sides of the bearing (this is called "channeling"), where the grease will further be flowing (sheared) between the balls and the seals being arranged at the axial sides of the bearing. This is a very dynamic process. In a simplified summary, the grease is sheared left and right of the balls that are traveling through this channel of grease. This process has a finite duration. It typically takes about 1 to 24 hours.

After this, the so called "unswept" volume, i.e., the volume left and/or right of the rolling elements, is totally filled with grease. Excess of grease within this volume will have leaked out through the seals. The rolling elements hardly touch the grease anymore. This process is called "clearing". The raceways have been totally cleared with grease. There will only be a very thin layer of oil left to lubricate the contacts. The contacts are now continuously fed by oil from the stationary grease (this is called "bleed").

In order to make this happen for a very long time, the grease should not get lost from the bearing. This means that as much as possible of the grease should be kept in the bearing. The bleed rate is not only determined by the volume of the grease but also by the properties of the grease. The grease is degrading by shearing, but also by being over-rolled by the rolling elements (mechanical degradation). Hence, for getting a long life of the grease, and thus of the bearing, it is helpful to ensure that the channeling and clearing phase are as short as possible but also the transverse flow of grease (from on axial side of the bearing to the other axial side of the bearing) should be minimized. This means that the grease needs to be moved away from the contacts as soon as possible and it should not come back.

If the bearing is non-symmetric, like it is the case for a bearing with an asymmetric cage having a backbone side and a pronged side, then the shear rates left and right will be different and therefore there are different grease viscosities left and right. Different shear rates occur, as on one side of the bearing, the grease is sheared between the surfaces of the balls and a sealing element and, on the other side of the bearing, the grease is sheared between the cage and the sealing element. As the shear rate depends also on the gap between the rotating plates (i.e., balls and sealing element on the one side of the bearing or cage and sealing element on the other side of the bearing) see equation (2), the shear rate is higher on the side of the backbone side of the cage, where the cage has a smaller distance to the sealing element than the balls to the sealing element.

Different shear rates and thus different grease viscosities will induce a transverse flow during the channeling and clearing phase. Such a transverse flow leads to an increased mechanical degradation of the grease due to the above-mentioned over-rolling of the grease by the rolling elements.

Further, as the viscosity of the lubricant is thinner on the side of the higher shear rates, the lubricant tends to flow to the axial side of the bearing having lower shear rates. Eventually, this may lead to a situation where almost no lubricant is left on the side with the higher shear rates and the side with the lower shear rates will be overfilled with lubricant. This overfill may lead to an overflow, i.e., leakage, of the lubricant from the bearing and thus to an insufficiently lubricated bearing.

It is therefore object of the present invention to provide a deep groove ball bearing with an improved lubrication.

SUMMARY OF THE INVENTION

This object is solved by a deep groove ball bearing comprises an inner ring, an outer ring and a plurality of balls being arranged between the inner ring and the outer ring.

The inner ring and the outer ring each comprise a raceway for the plurality of balls, wherein each raceway encompasses the plurality of balls symmetrically. Thereby, the balls may be optionally accommodated in a cage for guiding and separating the balls. Further, the deep groove ball bearing is lubricated by a lubricant, for example grease, being arranged on each axial side of the plurality of balls.

In contrast to conventional deep groove ball bearings, the raceways are offset in the same axial direction from the axial center of the inner ring and the outer ring such that the raceways are offset to the axial side of the deep groove ball bearing where the shear rate acting on the lubricant is higher than on the other axial side of the deep groove ball bearing. This allows for an improved and elevated lubricant distribution in the ball bearing as will be described below. Further, this arrangement is particularly preferred if an asymmetrical cage is used but may also be advantageous for other applications.

As mentioned above, the deep groove ball bearing may be lubricated, preferably by grease, wherein the lubricant is shear thinning which means that high shear strains acting on the lubricant lead to a low viscosity of the lubricant, i.e., to a more liquid lubricant. On the other hand, lower shear rates lead to a higher viscosity, and thus to a less liquid lubricant. As mentioned above, different shear strains may occur at different locations of the bearing. Thus, the lubricant disposed at a region with higher shear rates therefore flows from the region with higher shear rates to the region with lower shear rates, which results in an unbalanced lubrication situation.

Further, as the low viscous lubricant flows from the high shear rate side to the low shear rate side, the low shear rate side may become overfilled. This may result in an increased pressure on the low shear rate side and eventually a leakage from the bearing due to the increased pressure, leading to a poor lubrication of the bearing and therefore to a reduced lifetime of the bearing.

The difference between shear strains acting on the lubricant may be even worse when an asymmetrical cage having a backbone side and a pronged side is used. In this case, due to the smaller distance between one axial side of the bearing and the backbone side of the cage, the shear strains are increased in this region, leading to a low viscosity of the lubricant, whereas the shear strains at the pronged side having a greater distance between the balls and the other axial side of the bearing are lower or not present at all, which results in a more viscous lubricant. This situation further supports the flow of the lubricant from the high shear rate side of the bearing to the low shear rate side of the bearing, and eventually a leakage of lubricant from the bearing as described above.

Due to the arrangement of the raceways being offset from the axial center of the inner ring and the outer ring towards the side having higher shear rates, in the case of an asymmetric cage towards the backbone side of the cage, the lubrication situation can be improved as the space of the bearing for disposing lubricant on the higher shear rate side, for example the backbone side of the cage, is reduced so that less lubricant may be disposed on the high shear rate side, wherein more lubricant may be disposed on the lower shear rate side, for example the pronged side. Therefore, the volume of the bearing with lower or smaller shear rates is made greater than the other side of the bearing with higher shear rates. Thus, in summary, a reduced volume of lubricant flows from the higher shear rate side to the lower shear rate side, which in turn leads to a decreased pressure on the low shear rate side and therefore to less leakage and better lubrication of the bearing.

According to a further embodiment, the cage comprises a polymer material. This provides the advantage of a light-weight cage. Further, the polymer cage provides an improved snap-in function as the polymer material may be flexible and the balls may easily be snapped-in. Of course, the cage may also be made from different materials, for example metal, depending on design considerations.

According to a further embodiment, the cage is ball-guided. Such a cage does not contact the inner ring or the outer ring, but only the balls. This provides less wear of the inner and the outer ring, in particular the raceways.

According to a further embodiment, the deep groove ball bearing further comprises sealing elements which are arranged at both axial ends of the deep groove ball bearing. The sealing elements seal the bearing against contaminants from outside the bearing into the bearing and against lubricant leakage from inside the bearing to the outside. The sealing elements may comprise for example an elastic material, like rubber or polymer, but may also comprise a combination of materials. Due to the decreased pressure on the sealing elements at the lower shear rate side as described above, the lifetime of the sealing elements may be increased.

According to a further embodiment, the distance between the backbone side of the cage and one sealing element is smaller than the distance between the balls and the other sealing element. In particular, the backbone side of the cage is arranged with minimal distance to one of the sealing elements, i.e., the backbone side of the cage is arranged adjacent or in close proximity to the sealing element so that it is almost touching the sealing element. Thus, the volume defined between the inner ring, the outer ring, the backbone side of the cage and one sealing element is smaller than the volume defined between the inner ring, the outer ring, the pronged side of the cage and the other sealing element. Thus, the space on the bearing side with the lower shear rates is maximized, which provides the advantage of a reduced leakage of the lubricant as described above.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In the following, preferred embodiments of the invention are described in relation to the drawings, wherein the drawings are exemplarily only, and are not intended to limit the scope of protection.

The figures show.

In the following same or similar functioning elements are indicated with the same reference numerals.

DETAILED DESCRIPTION OF THE INVENTION

Figure 1:
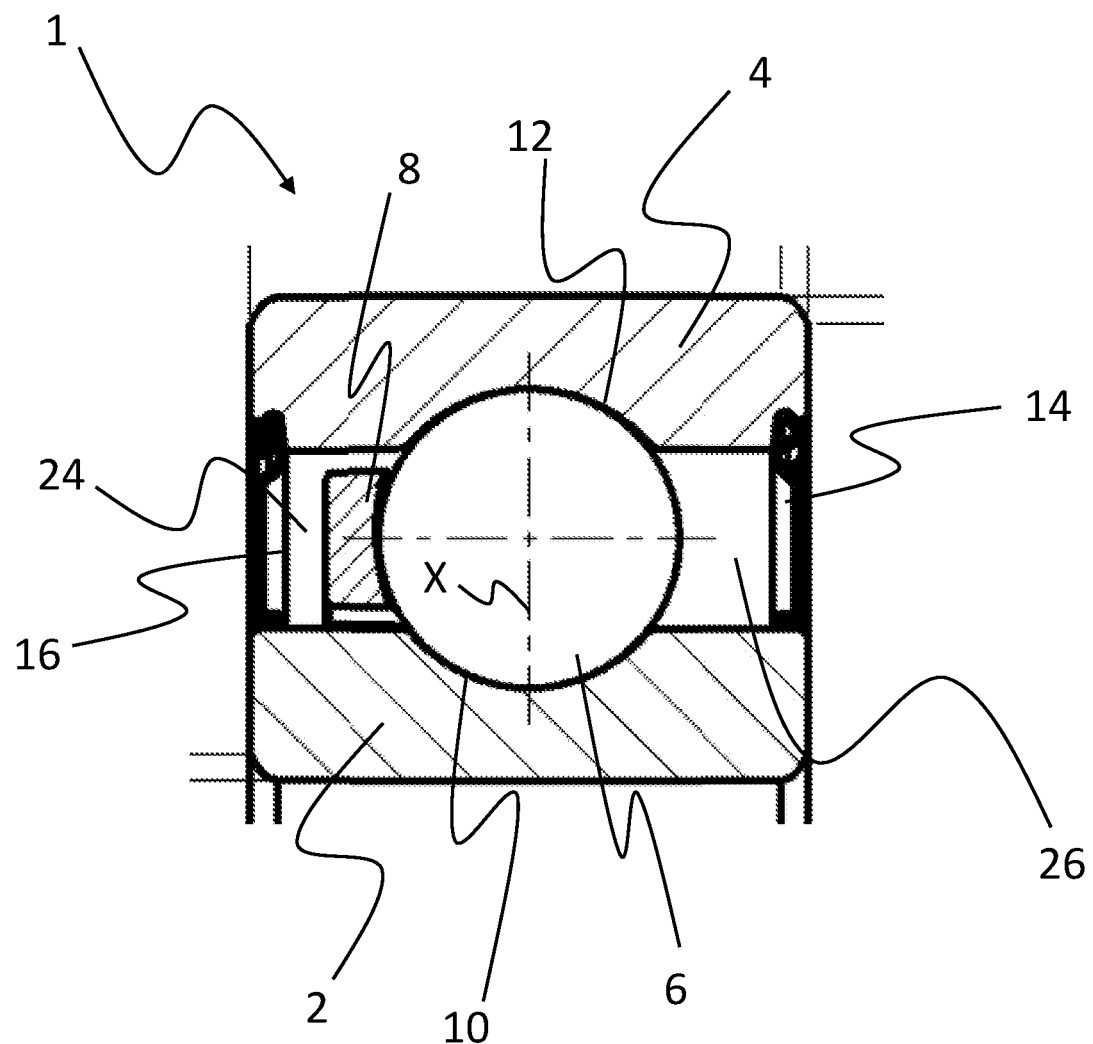
FIG. 1: a cross sectional view of a deep groove ball bearing according to the prior art.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows a deep groove ball bearing 1 of the prior art. The deep groove ball bearing 1 comprises an inner ring 2, an outer ring 4 and a plurality of balls 6 being arranged between the inner ring 2 and the outer ring 4. The balls 6 are hold by a cage 8.

Figure 2:
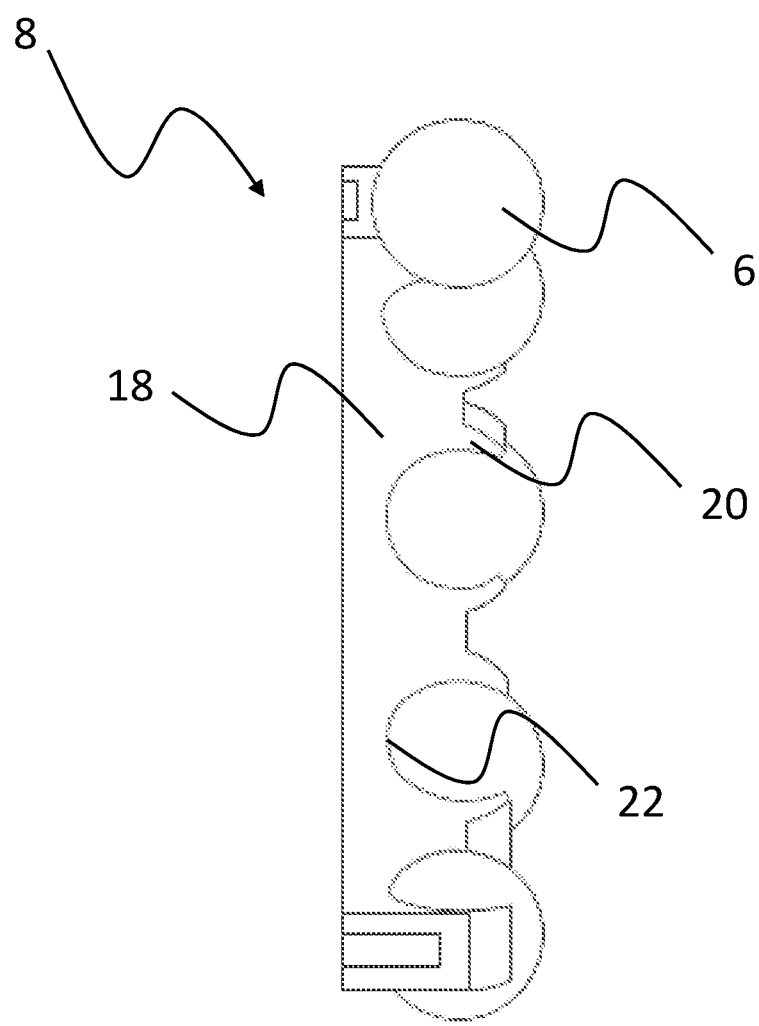
FIG. 2: a cross sectional view of a cage for a deep groove ball bearing.

The cage 8 may be a snap-type, in particular ball-guided, cage having a backbone side 18 and a pronged side 20 (see FIG. 2). The backbone side 18 of the cage 8 is arranged at the axially left side 24 of the bearing 1, wherein the pronged side 20 is directed towards the axially right side 26 of the bearing 1 and is arranged in between the balls 6. The pronged arrangement forms pockets 22 in which the balls 6 may be snapped in.

Each ring 2, 4 comprises a raceway 10, 12 which encompass the balls 6 in a symmetrical way. As can be seen, the raceways 10, 12 are arranged symmetrically in the axial direction with respect to an axial center X of the bearing 1. Sealing elements 14, 16 are arranged on both axial sides 24, 26 of the bearing 1.

When the bearing 1 is filled with lubricant, the lubricant may be exposed to different strains, i.e., shear rates, on both axial sides of the bearing 1. Particularly, this is the case as the asymmetrical design of the cage 8 leads to different shear strains acting on the lubricant, e.g., grease, on the axially left and right side 24, 26 of the bearing. This means that higher shear rates occur on the axially left side 24, where the backbone side 18 of the cage 8 is arranged (leading to a relative movement between the sealing element 16 and the backbone side 18 and thus to shear strains), and lower shear rates occur on the axially right side 26, where no part of the cage 8 is arranged.

As the lubricant is shear thinning, the lubricant will be thinner and more liquid on the side 24 with a high shear rate (as a high shear rate is associated with a low viscosity of the lubricant) compared to the side 26 with a lower shear rate. As a result, the lubricant flows from left 24 to right 26. In the worst case, the side 24 with the higher shear rate is completely empty and the lubricant has flown to the right side 26. This leads to an overfilled side 26 of the bearing 1 and potentially to lubricant leakage when the pressure of the lubricant at the side 26 is too high. This, in turn, leads to a poorly lubricated bearing 1 and therefore to a reduced lifetime of the bearing 1.

Figure 3:
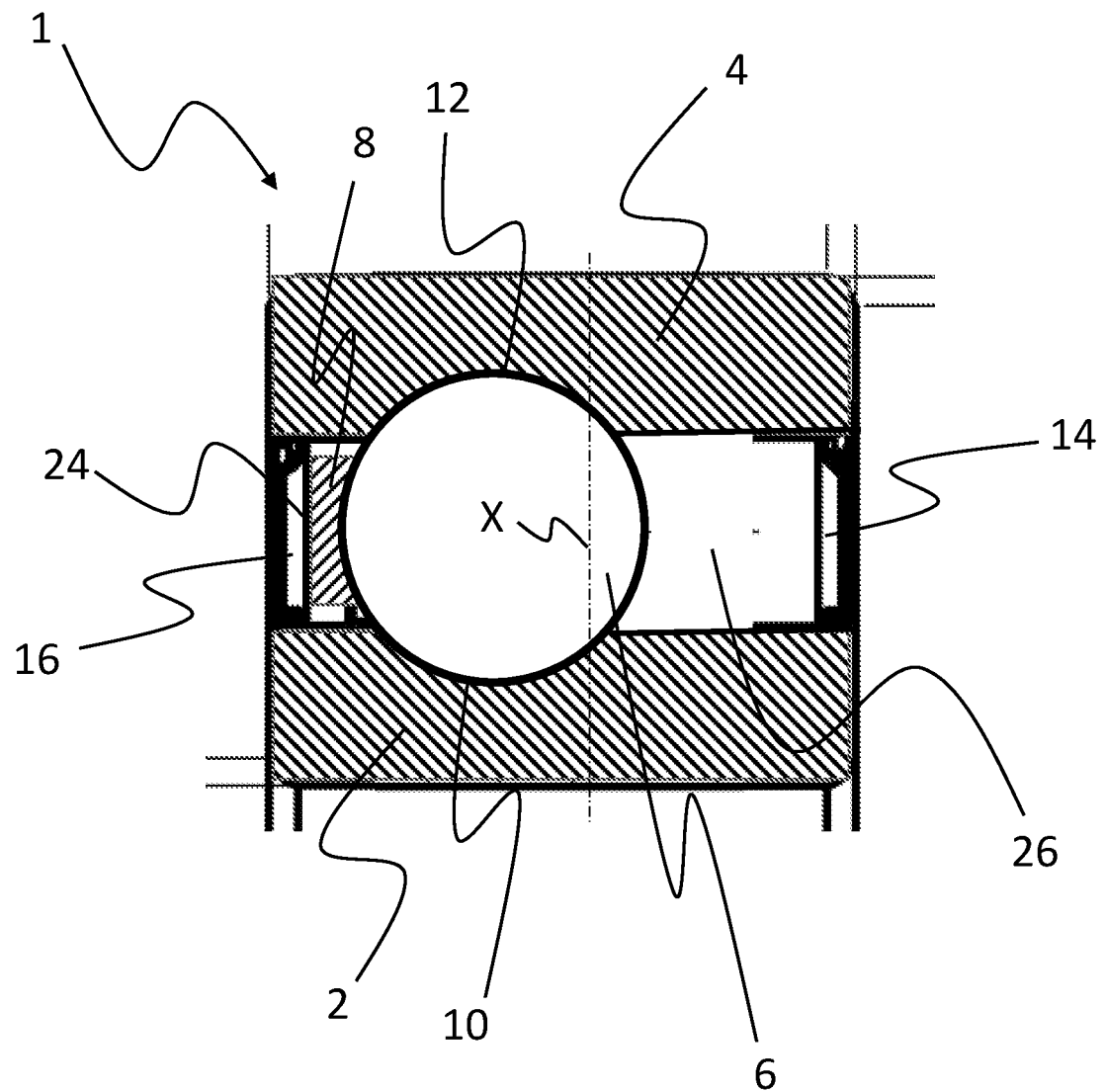
FIG. 3: a cross sectional view of a deep groove ball bearing according to the invention.

In contrast to the prior art bearing of FIG. 1, the deep groove ball bearing 1 as shown in FIG. 3 has raceways 10, 12 which are offset in the same axial direction from the axial center X of the inner ring 2 and the outer ring 4, i.e., offset to the higher shear rate side 24. This allows for an improved and elevated lubricant distribution in the deep groove ball bearing 1. This arrangement is particularly preferred if the asymmetrical cage 8 is used, but may also be advantageous in case no cage or other cage designs are used.

The cage 8 may consist of a polymer material. This provides the advantage of a lightweight cage 8. Further, the balls 6 may be easily snapped in as the polymer material may be flexible.

As explained with reference to FIG. 1, the lubricant within the deep groove ball bearing 1 is shear thinning, i.e., high shear strains acting on the lubricant lead to a low viscosity of the lubricant, i.e., to a more liquid lubricant, whereas lower shear rates lead to a higher viscosity, and thus to a less liquid lubricant.

The arrangement of the raceways 10, 12, which are offset from the axial center X of the inner ring 2 and the outer ring 4 towards the backbone side 18 of the cage 8, improves the lubrication situation compared to the conventional bearing of FIG. 1. This is the case as the space 24 of the bearing 1, in which lubricant can be disposed on the backbone side 18 of the cage 8, is reduced so that less lubricant may be disposed on the backbone side 18, wherein more lubricant may be disposed on the pronged side 20 or the space 26 of the bearing 1, respectively.

This means that the volume or space 26 of the bearing 1, where smaller shear rates occur, is made greater than the other side 24 of the bearing 1, where higher shear rates occur. Therefore, a reduced volume of lubricant flows from the higher shear rate side 24 to the lower shear rate side 26. Hence, on the lower shear rate side 26, the pressure of the lubricant is decreased, or not increased, (compared with the conventional bearing of FIG. 1), which leads to less leakage and better lubrication of the bearing 1.

As described above, the deep groove ball bearing 1 further comprises sealing elements 14, 16 which are arranged at both axial ends of the deep groove ball bearing 1. As the pressure on the low shear rate side 26 is reduced, also the pressure being applied to the sealing element 14 is reduced. Thus, leakage through the sealing element 14 is reduced and also the lifetime of the sealing element 14 is increased.

As can be seen in FIG. 3, the backbone side 18 of the cage 8 is arranged adjacent to the sealing element 16, with minimal distance, so that it is almost touching the sealing element 16. Thus, the space 24 between the cage 8 and the sealing element 16, and thus the space with higher shear rates, is reduced as far as possible whereas the space 26 on the other side of the bearing 1 for receiving lubricant is maximized. This provides the advantage of a reduced leakage of the lubricant as described above.

It should be noted that, although the backbone side 18 is shown to be on the axially left side, the overall arrangement of the bearing 1 may also be inverted, i.e., the backbone side 18 on the axially right side 26 and the raceways 10, 12 also offset to the axially right side 26. Further, the bearing 1 may also be used with a different kind of cage 8.

In summary, the lifetime of the deep groove ball bearing may be improved due to an improved lubrication due to less lubricant leakage. This is the case as the leakage of the lubricant from one side of the bearing to the other side is reduced and thus no overfill of the latter side of the bearing occurs which would otherwise lead to an increased pressure and thus to leakage of the lubricant from the bearing.

The invention claimed is:

1. A deep groove ball bearing comprising:
   an inner ring,
   an outer ring, and
   a plurality of balls being arranged between the inner ring and the outer ring, wherein
   the inner ring and the outer ring each comprise a raceway for the plurality of balls, wherein
   each raceway encompasses the plurality of balls symmetrically, wherein
   the deep groove ball bearing is lubricated by a lubricant being arranged on each axial side of the plurality of balls, and wherein
   the raceways are offset in the same axial direction from the axial center of the inner ring and the outer ring such that the raceways are offset to the axial side of the deep groove ball bearing where the shear rate acting on the lubricant is higher than on the other axial side of the deep groove ball bearing.

2. The deep groove ball bearing according to claim 1, wherein the deep groove ball bearing further comprises a cage being arranged between the inner ring and the outer ring for holding the balls, wherein the cage is a snap-type cage.

3. The deep groove ball bearing according to claim 2, wherein the cage comprises a backbone side and a pronged side, wherein the raceways are offset from the axial center of the inner ring and the outer ring towards the backbone side of the cage.

4. The deep groove ball bearing according to claim 2, wherein the cage comprises a polymer material.

5. The deep groove ball bearing according to claim 2, wherein the cage is ball-guided.

6. The deep groove ball bearing according to claim 1, further comprising sealing elements which are arranged at both axial ends of the deep groove ball bearing.

7. The deep groove ball bearing according to claim 6, wherein the distance between the backbone side of the cage and one sealing element is smaller than the distance between the balls and the other sealing element.

8. The deep groove ball bearing according to claim 7, wherein the backbone side of the cage is arranged adjacent to the one sealing element.

9. The deep groove ball bearing according to claim 6, wherein the volume defined between the inner ring, the outer ring, the backbone side of the cage and one sealing element is smaller than the volume defined between the inner ring, the outer ring, a pronged side of the cage and the other sealing element.

\* \* \* \* \*